E. H. MUELLER.
BEAN SEPARATOR.
APPLICATION FILED FEB. 19, 1917.

1,240,999.

Patented Sept. 25, 1917.
4 SHEETS—SHEET 1.

WITNESSES:
Harry A. Beimes
Else M. Siegel

INVENTOR.
Ernst H. Mueller.
BY
Emil Staser
ATTORNEY.

E. H. MUELLER.
BEAN SEPARATOR.
APPLICATION FILED FEB. 19, 1917.

1,240,999.

Patented Sept. 25, 1917.
4 SHEETS—SHEET 3.

WITNESSES:
Harry A. Beimer
Else M. Sugl

INVENTOR.
Ernst H. Mueller.
BY
Emil Starek
ATTORNEY.

E. H. MUELLER.
BEAN SEPARATOR.
APPLICATION FILED FEB. 19, 1917.
1,240,999.
Patented Sept. 25, 1917.
4 SHEETS—SHEET 4.
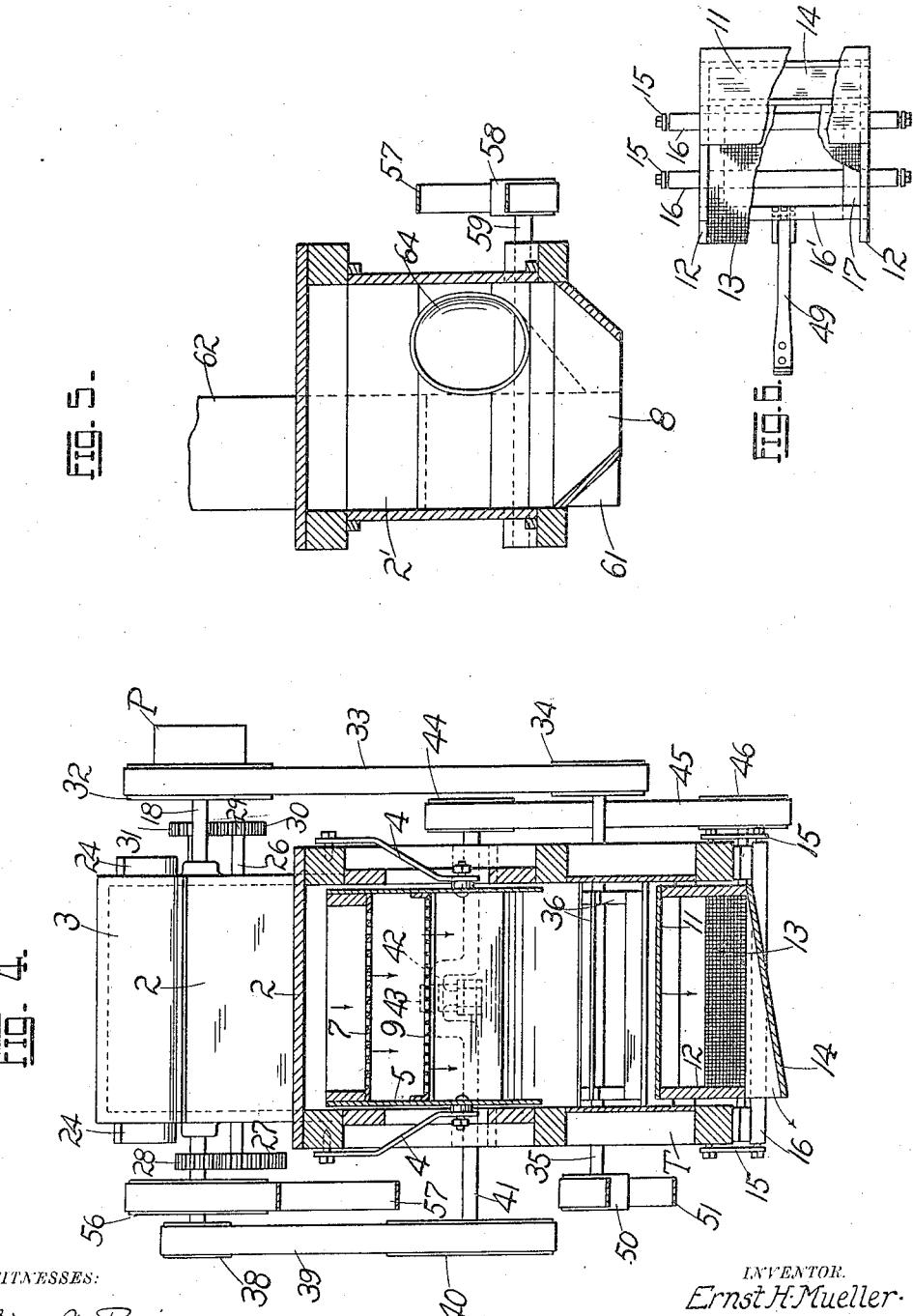
WITNESSES:
Harry A. Binney
Else M. Siegel
INVENTOR.
Ernst H. Mueller.
BY
ATTORNEY.

UNITED STATES PATENT OFFICE.

ERNST H. MUELLER, OF MENFRO, MISSOURI.

BEAN-SEPARATOR.

1,240,999.

Specification of Letters Patent. Patented Sept. 25, 1917.

Application filed February 19, 1917. Serial No. 149,484.

*To all whom it may concern:*

Be it known that I, ERNST H. MUELLER, a citizen of the United States, residing at Menfro, in the county of Perry and State of Missouri, have invented certain new and useful Improvements in Bean-Separators, of which the following is a full, clear, and exact description, reference being had to the accompanying drawings, forming a part hereof.

My invention has relation to improvements in bean separators; and it consists in the novel features of construction more fully set forth in the specification and pointed out in the claims.

The present invention is particularly directed to apparatus for separating beans from their pods and from the remaining portions of the plant, it being understood however that the invention may be applied to treating any form of dry dehiscent fruit. The object of the invention is to construct an apparatus which will separate a maximum quantity of the beans (or other seed) in a minimum amount of time; one in which the separation shall be thorough and complete, all foreign matter and dirt being effectively eliminated. A further object is to provide an apparatus which shall be simple, comparatively cheap, one whose parts are readily accessible, and one possessing further and other advantages better apparent from the following detailed description of the invention in connection with the accompanying drawings in which—

Figure 1:
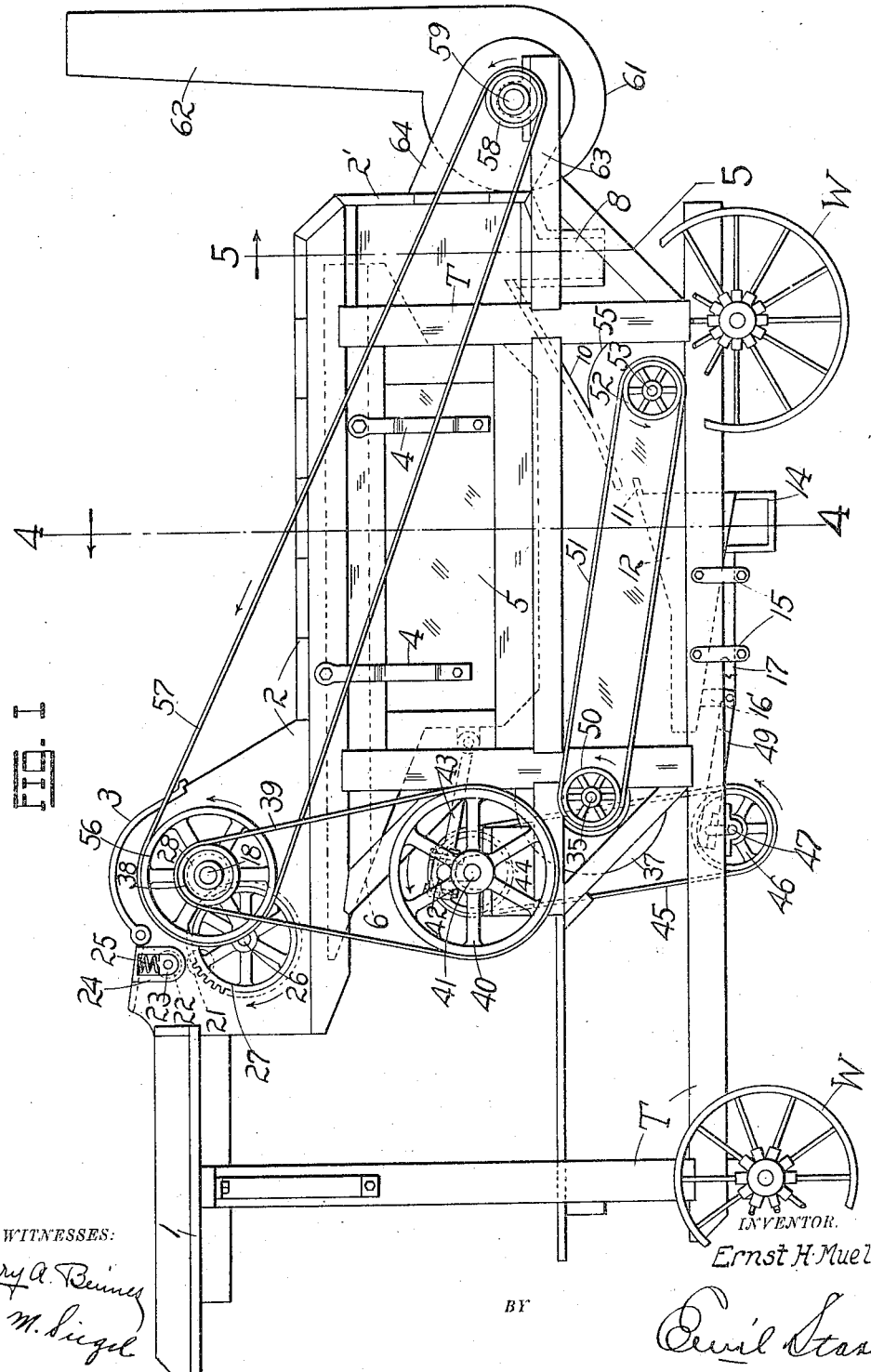
Figure 2:
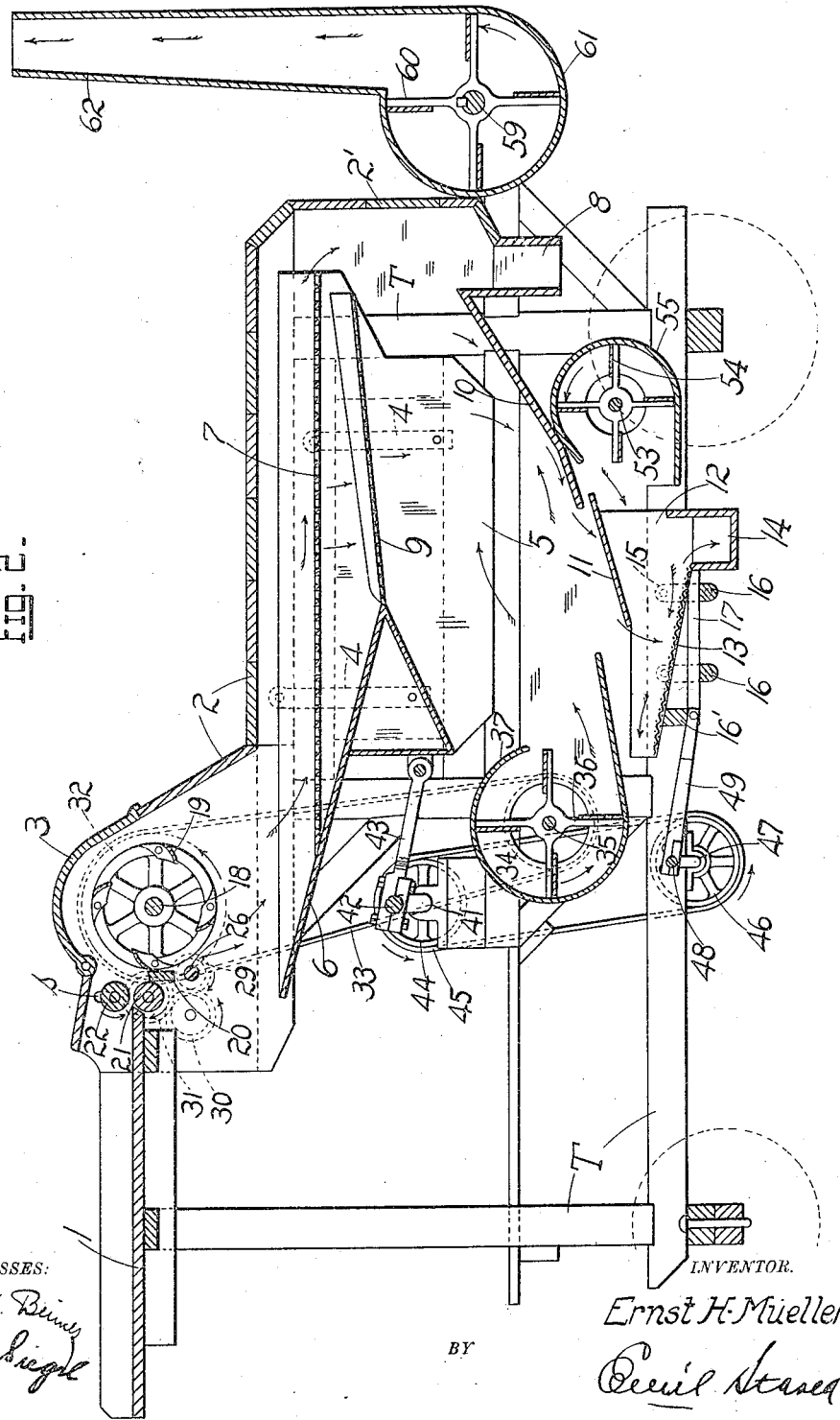
Figure 3:
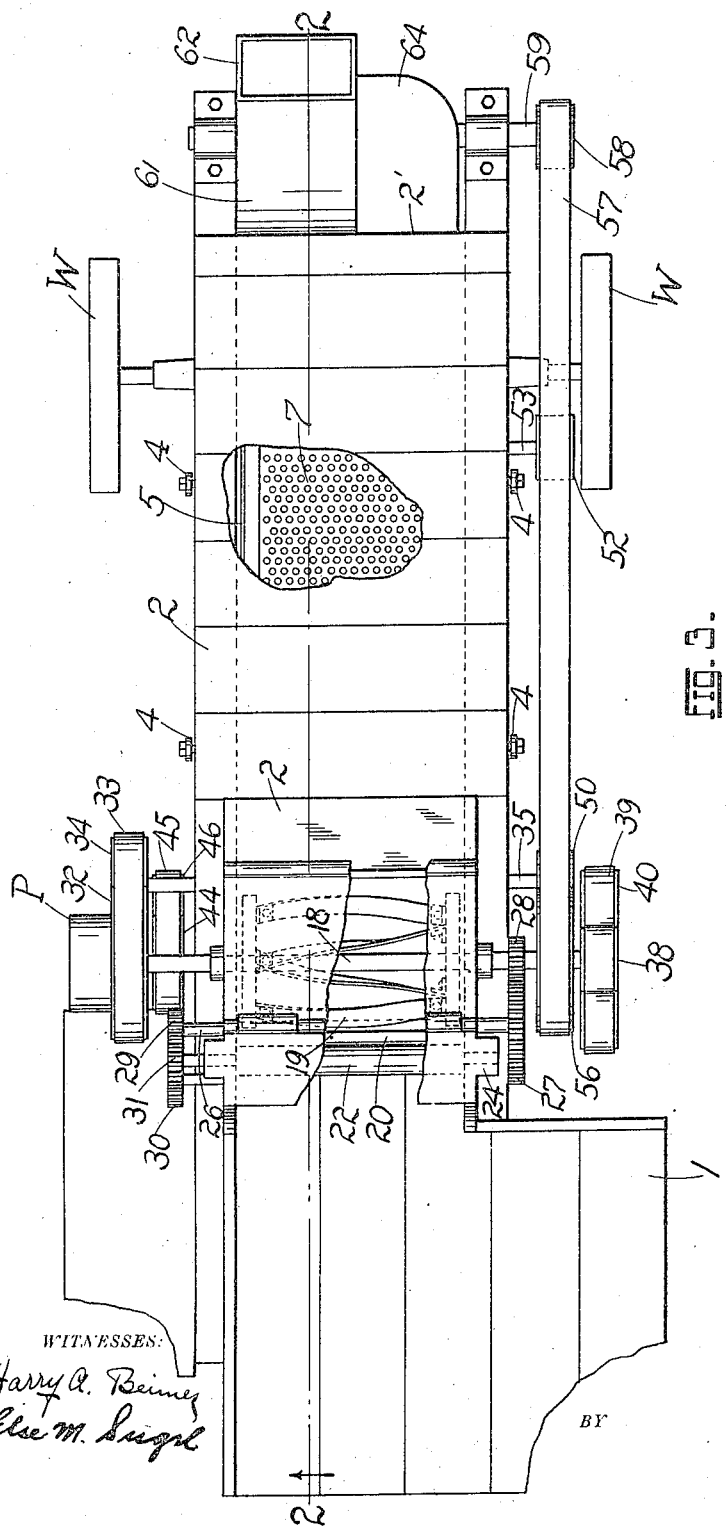

Figure 1 represents a side elevation of the separator; Fig. 2 is a vertical longitudinal section on the line 2—2 of Fig. 3; Fig. 3 is a top plan with parts broken away; Fig. 4 is a vertical transverse section on the line 4—4 of Fig. 1; Fig. 5 is a vertical cross-section on the line 5—5 of Fig. 1; and Fig. 6 is a detached top plan of the bottom shaking box and screen with parts broken away.

Referring to the drawings, T represents a wagon body or frame mounted on wheels W so that the same may be readily moved to any point required as well understood in the art. Carried at the top of the front of the machine is a platform 1 whose rear end terminates in the chamber formed by the hood or cover 2, the front portion of the hood being properly contoured or shaped to envelop the several operating parts mounted within it, access to said parts being had through a hinged door or lid 3 as shown. The hood 2 with its rear depending portion 2' is secured to the wagon body in any approved mechanical manner, and, falling as it does within the purview of the skilled mechanic, no description thereof is necessary. Suspended on each side from links 4 depending from the sides of the wagon frame is a shaking screen-supporting member or box 5 whose forward portion is formed with an inclined platform 6. From the medial portion of the platform 6 there extends rearwardly the main screening grate 7 said grate discharging its overflow into the housing extension 2', whence said overflow drops through the spout 8. From the bottom edge of the platform 6 there leads rearwardly the forwardly sloping supplemental screen 9 through which the beans (or other seed) drop, being caught in part on the stationary bottom forwardly inclined platform 10, and in part on the shaking platform 11 connecting the sides of the bottom screen-box 12, said box being provided with a rearwardly sloping or inclined screen 13 which delivers the cleansed beans to a chute 14 whence they discharge into any suitable receptacle (not shown). The box 12 is suspended from the pivoted links 15 coupled pivotally to the box and to the bottom of the wagon frame respectively, the bottom of the box below the screen 13 being constructed in any suitable mechanical manner, but here shown as composed of the transverse bars 16, 16', and longitudinal bars 17, the lower ends of the links 15 being secured to the cross members 16.

Mounted across the upper front chamber of the housing 2 beneath the hinged lid or door 3 is the main drive shaft 18 one end of which projects a suitable distance beyond the wagon frame and terminates in a belt pulley P which can be belted up to any suitable belt or drive (not shown). On the shaft 18 and within the housing 2 is mounted a bladed cylinder or rotary cutter 19 the blades of which coöperate with a stationary knife 20, the rotary cutter member or cylinder rotating counter-clockwise as indicated by the arrow in Fig. 2. Between the blade 20 and the rear edge of the platform 1 is mounted a driven feed-roller 21 with which coöperates the guide roller 22, the spindles of the latter being mounted in movable bearings 23 mounted in the slotted brackets 24, suitable slots s being formed in the side walls of the housing 2 for the passage and free play of the spindles of the roller. The bearings 23 are controlled by springs 25 which permit the roller 22 to yield according to the thickness of the material fed between the rollers 21, 22. There is however nothing new in the rollers *per se*. Below the shaft 18 and below the blade 20 is a transverse shaft 26 one end of which carries a gear wheel 27 which meshes with a pinion 28 on the shaft 18. This necessarily imparts to the gear wheel 27 a rotation clockwise as indicated by the arrow in Fig. 1. The opposite end of the shaft 26 on the other hand carries a pinion 29 which meshes with an intermediate gear or idler 30, said gear 30 in turn engaging a pinion 31 on the spindle of the roller 21. By means of the connections just described, the shaft 26 will necessarily impart to the roller 21 a rotation clockwise whereby the stock or material deposited on the platform 1 and delivered to the rollers 21, 22, will be carried rearward across the blade 20 and in the path of the revolving rotary cutter 19.

Mounted on the shaft 18 adjacent the pulley P is a belt pulley 32 from which leads a belt 33 over a pulley 34 on the adjacent terminal of a fan-shaft 35, the fan 36 of which operates in a casing 37 which discharges or blows the air into the space beneath the screen 9 and above the platforms 10 and 11. Obviously, the fan 36 will rotate in the same direction as the rotary cutter 19. On the opposite end of the shaft 18 is mounted a pulley 38 from which leads a belt 39 over a larger pulley 40 on the upper transverse crank shaft 41 mounted in suitable bearings on the wagon frame, the crank pin 42 of the crank of said shaft being coupled pivotally to the front terminal of a link 43 whose rear end is pivotally secured in any approved mechanical manner to the front of the shaking oscillating screen-box 5 suspended from the links 4. One of the terminals of the shaft 41 is provided with a pulley 44 from which leads a belt 45 over a corresponding or similar pulley 46 on the bottom parallel crank-shaft 47 to the crank pin 48 of which is pivotally coupled the front end of a link or connecting rod 49 the rear end of which is pivotally secured to the oscillating screen-box 12. Thus the shaft 41 imparts rotation to the shaft 47, the screen-boxes 5 and 12 with their screens or grates oscillating or shaking substantially in unison, the pulleys 44 and 46 being substantially of the same diameter. At the end of the fan shaft 35 opposite to that carrying the pulley 34 is a pulley 50 from which leads a belt 51 over a similar pulley 52 on a rear parallel fan shaft 53 the fan 54 whereof operates in a casing 55 which discharges beneath the platforms 10 and 11 and in an opposite direction to, and beneath the currents of the fan casing 37, the currents from the casing 55 flowing over the finishing screen 13. Mounted on the shaft 18 between the pulley 38 and the gear 28 is a pulley 56 from which passes rearwardly a belt 57 over a pulley 58 on a fan shaft 59 the fan 60 whereof operates as an exhauster in a casing 61 from which leads the discharge pipe or uptake 62, the casing being supported on brackets 63 secured to the wagon frame. The intake to the fan casing 61 is through a short tube or conduit 64 which taps the end of the fan casing, said conduit leading directly from the chamber of the hood 2' at the rear of the machine.

From the foregoing description, the operation will be readily understood, but briefly stated it is substantially as follows: The dried plant is deposited on the platform 1 and pushed toward the feed rollers 21, 22, rotation having been previously or at the same time imparted to the shaft 18 as indicated by the arrows. Since the various arrows on the drawings indicate the direction of rotation which the several shafts, fans, pulleys and belts necessarily take under the circumstances, there is no occasion to repeat what has already been fully described. Suffice it to say however that during the rotation of the several parts the boxes 5 and 12 with their grates or screens are shaken or oscillated longitudinally as clearly obvious from the drawings. As the rotary cutter 19 revolves it cuts up or disintegrates the dried pods and other parts of the plant constituting the feed, thereby releasing the beans which immediately fall onto the inclined platform 6 of the shaking screen box 5. The shaking action tends to advance the material rearward along the screen 7, the majority of the beans however passing through the screen and dropping onto the supplemental grate or screen 9, any beans which flow over the rear edge of the screen 7 dropping through the chamber of the housing extension 2' into and out of the discharge spout 8. The beans which drop onto the screen 9 pass through the meshes thereof and are caught on the platforms 10 and 11, the adjacent ends of which overlap (Fig. 2) so that the beans sliding off the platform 10 may be caught on the platform 11 whence they flow onto the finishing screen 13, the latter dipping toward the spout 14 into which the beans gravitate, the dirt and foreign matter being released through the meshes of the screen and allowed to escape, it being understood of course that the beans can not drop through this finishing screen. The shaking of the screens 7 and 9 tends to loosen the beans from the comminuted light chaff and dirt, the light particles thus released being picked up by the air currents generated by the fans. The chaff and light particles above the platforms 10 and 11 are picked up by the rearwardly flowing currents generated by the fans 36 and 60 and directly carried through the uptake 62 and discharged into the atmosphere. The forwardly flowing currents generated by the fan 54 picked up the light particles which still accompany the beans as the latter are dropped onto the screen 13, the particles suspended in these currents being blown out from the machine through the space below the bottom of the fan casing 37, these forwardly flowing currents playing over the screen 13 and over the layer of beans rolling down the same toward the spout or chute 14.

It will be seen from the foregoing that there are two points of discharge for the chaff and light particles which do not drop through the screen 13, to wit, a discharge through the uptake 62 in the rear of the machine, and a second discharge through the front of the machine below the bottom of the fan casing 37. There are also two points of discharge for the separated beans, to wit, a discharge from the finishing screen 13 into the chute 14, and a second discharge of overflow beans from the screen 7 through the spout 8. The beans when delivered from the machine are thoroughly cleansed of foreign matter, the latter being effectively released and shaken off under the shaking and blowing to which the beans are subjected. The inclined screen 9 while allowing all beans and particles of equivalent or smaller size to pass through, gradually causes all large particles (usually light material) to advance rearward along the screen, and when the rear end of the screen is reached, the material is caught by the air currents and drawn through the conduit 64 and into the fan casing 61 and blown out of the riser 62.

I do not wish to be restricted to the use of crank shafts to impart a reciprocation or shaking movement to the screens, as cams or equivalent constructions might be substituted without affecting the nature or spirit of my invention. The machine may in fact be altered in many particulars without a departure from the spirit of the invention. While termed a bean separator, it may be used as a pea separator, or for separating seeds generally, the title of the invention in no wise restricting its scope. It may be stated in passing that as the beans are precipitated from the grate 9 onto the platforms 10 and 11, they naturally cut across a current of air which blows off from the beans any light particles adhering thereto, and carries the same to the conduit 64. The chaff and light material coming from the screens 7 and 9, likewise enters these currents, all foreign matter being thus carried to the same point by the rearwardly moving air currents.

Having described my invention what I claim is:

1. In a bean separator, a shaking platform for intercepting the released beans and chaff, a plurality of superposed grates disposed at an angle to one another and inclining in opposite directions operating in conjunction with the shaking platform, a stationary platform disposed a suitable distance below the lowermost grate of the series for intercepting a part of the beans, a shaking platform operating in conjunction with the fixed platform to receive another part of the precipitating beans and the beans from the stationary platform, a finishing screen operating in conjunction with and disposed at an angle to the shaking platform, and suitable air moving apparatus for acting on the precipitating beans and on the chaff separated therefrom, whereby the light particles and chaff are carried away by the air currents.

2. In a bean separator, a shaking box provided with a pair of grates in superposed relation and disposed at an angle to one another and spaced apart, and with an inclined platform delivering the feed to the upper grate, a second shaking box disposed a suitable distance below the bottom grate of the first mentioned box, a finishing screen carried by said second mentioned box, a platform on said box inclined toward and discharging onto the finishing screen, a stationary platform operating in conjunction with and positioned above the platform of the second mentioned shaking box, a fan positioned beneath said stationary platform and directing currents of air in a given direction between the shaking platform and the finishing screen, fans operating to direct currents of air in the opposite direction through the space below the first mentioned shaking box and the stationary platform and shaking platform of the second mentioned shaking box, and means adjacent to one of the fans for removing any overflow of beans from the upper grate of the first mentioned shaking box.

3. In a separator of the character described, a shaking box provided with two superposed screens meshed to permit passage of the beans therethrough and spaced apart, and with an inclined platform leading to the upper screen, a second shaking box mounted a suitable distance centrally below the first box and provided with a finishing screen and an inclined platform discharging thereonto, a fixed platform positioned in proximity to and overlapping the edge of the platform on the second mentioned shaking box, a fan disposed forward of the lower shaking box and discharging rearwardly into the space between the boxes, an exhauster for drawing the currents from the rear of the machine to a suitable point of discharge, a second fan discharging forwardly below the platform of the second shaking box and below the fixed platform coöperating therewith and over the finishing screen, means rearward of said last mentioned fan for conducting away the beans discharged from the upper screen of the first mentioned shaking box, and independent means for removing the beans from the finishing screen of the second mentioned shaking box.

In testimony whereof I affix my signature in presence of two witnesses.

ERNST H. MUELLER.

Witnesses:
EMIL STAREK,
ELSE M. SIEGEL.